I. J. W. Adams.
Indicator.
No. 101,967.      Patented Apr. 19, 1870.
Fig. 1.
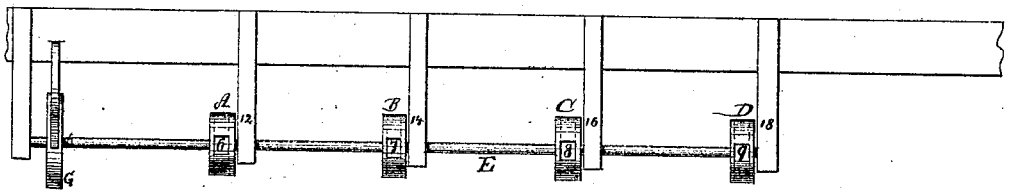
Fig. 2.
Fig. 3.
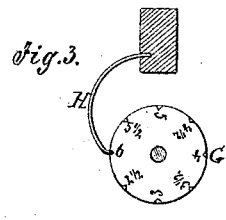
Fig. 4.    Fig. 5.
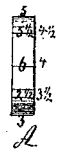 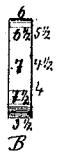
Witnesses:
A. Bennertendorf
Jno. F. Brooks
Inventor:
I. J. W. Adams.
Per Munn & Co
Attorneys.

United States Patent Office.

ISAAC J. W. ADAMS, OF SALISBURY, MARYLAND.

Letters Patent No. 101,967, dated April 19, 1870.

IMPROVEMENT IN APPARATUS FOR MEASURING BOARDS.

The Schedule referred to in these Letters Patent and making part of the same

*To all whom it may concern:*

Be it known that I, ISAAC J. W. ADAMS, of Salisbury, in the county of Wicomico and State of Maryland, have invented a new and useful Improvement in Measuring Boards; and I do hereby declare that the following is a full, clear, and exact description thereof, which will enable others skilled in the art to make and use the same, reference being had to the accompanying drawings forming part of this specification.

This invention relates to a new and useful improvement in mode of measuring boards and planks, especially adapted to measuring flooring as it is delivered from the planing-machine, whereby accuracy of measurement is secured and time saved, and consists in the construction and arrangement of a series of adjustable disks on a horizontal shaft, on the surfaces or peripheries of which disks the quantity or number of feet in a board is indicated. On the same shaft is a ratchet dial-plate on which the widths of the boards are marked, while the length of the board is marked on the table on which the board is delivered from the planer, all arranged and operating as hereinafter more fully described.

In the accompanying drawing—

Figure 1 represents an elevation of the shaft bearing the disks and ratchet-dial.

Figure 2 is an edge view of the table which receives the board from the machine, on which table the lengths are marked.

Figure 3 is a side view of the ratchet-wheel, on which the widths of the boards are marked.

Figures 4 and 5 show two of the disks uncovered.

Similar letters of reference indicate corresponding parts.

A, B, C, and D are the disks, which are covered by casings, each casing having an opening which exposes only one number on the face of the disk. These casings are stationary, while the disks may be revolved by means of the shaft E, to which they are fastened. The quantity of lumber contained in a board of any of the ordinary lengths is marked on these disks, each disk being designed for some one particular length, as 12, 14, 16, 18 feet, &c.; these numbers, and, consequently, their disks, being increased or diminished according to the different lengths of the boards to be measured. The length to correspond with each disk is marked on the table F, as seen in the drawing.

G is the ratchet dial-plate, on the side of which the width of the board is marked. The dial is fixed upon the shaft so that the numbers on its side correspond with the numbers on the peripheries of the disks. In dressing flooring or other boards to particular widths the lumber is assorted; the ratchet dial (with the disks) will be turned from time to time to correspond with the width being dressed. If the machine is to dress lumber six inches wide, the ratchet is turned as seen in the drawing, the spring pawl H serving as an index-finger, and the quantity contained in a board of that width will be shown on the disks for any of the lengths marked on the table. The disks showing the quantity, it will be seen, are placed directly over the lengths marked on the table.

As the board is delivered from the machine, the person who marks the quantity looks to see where its forward end is. If it is at 12, he marks the board 6, as indicated on the disk directly over that length, and so for any of the lengths on the table.

When any other width is to be dressed, the ratchet or dial-plate is turned to that width, as before stated. The quantity or number of feet in the board for that width will be seen on the disks for any of the lengths which may be marked on the table.

For boards of different thicknesses reduced to inch measure, two or more disks may be employed in the same case, with slides over the opening of those not in immediate use.

By this arrangement no board-rule is required; no mistake as to quantity can be made, while much valuable time is saved.

Having thus described my invention,

I claim as new and desire to secure by Letters Patent—

The combination of the table F (with the lengths marked thereon) with the ratchet dial-plate and disks above described, substantially as and for the purposes specified.

I. J. W. ADAMS.

Witnesses:
 JOS. W. WARD,
 L. JAMES CATHELL.